(12) United States Patent
Miller

(10) Patent No.: US 6,220,566 B1
(45) Date of Patent: *Apr. 24, 2001

(54) INCREMENTALLY POSITIONABLE BALL VALVE

(75) Inventor: Kent Alan Miller, Hendersonville, TN (US)

(73) Assignee: Mueller Industries, Inc., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/158,386

(22) Filed: Sep. 22, 1998

Related U.S. Application Data

(63) Continuation-in-part of application No. 08/602,619, filed on Feb. 16, 1996, now Pat. No. 5,810,326.

(51) Int. Cl.$^7$ .................................................. F16K 31/12
(52) U.S. Cl. .............................. 251/58; 62/160; 62/324.6; 91/459; 137/487.5; 137/625.64; 251/129.04
(58) Field of Search ................................ 251/129.04, 58, 251/30.01, 31, 315.01; 62/160, 324.6; 137/487.5, 625.64, 625.65; 91/459

(56) References Cited

U.S. PATENT DOCUMENTS

| 2,082,940 | * | 6/1937 | Brisbane et al. ................... 251/58 X |
| 2,688,340 |  | 9/1954 | Stehlin . |
| 2,894,715 | * | 7/1959 | Bostock ................................ 251/58 |
| 2,963,260 | * | 12/1960 | Siravo .............................. 251/58 X |
| 3,037,484 |  | 6/1962 | Dixon . |
| 3,099,287 |  | 7/1963 | Manor . |
| 3,452,961 | * | 7/1969 | Forsman ................................ 251/31 |
| 3,559,536 |  | 2/1971 | Mason . |
| 3,650,506 |  | 3/1972 | Bruton . |
| 3,690,615 | * | 9/1972 | Rogers .............................. 251/58 X |
| 3,707,161 | * | 12/1972 | Crawford .............................. 137/269 |
| 3,806,083 | * | 4/1974 | Phillips et al. ........................ 251/62 |
| 3,888,280 |  | 6/1975 | Tartaglia . |
| 4,002,319 |  | 1/1977 | Pool et al. . |
| 4,130,128 | * | 12/1978 | Kaneko .............................. 137/269 |
| 4,422,618 | * | 12/1983 | Lawson ................................ 251/58 |
| 4,552,334 |  | 11/1985 | Tomiyama et al. . |
| 4,564,169 | * | 1/1986 | Nordlund .............................. 251/58 |
| 4,615,354 |  | 10/1986 | Bianchi . |
| 4,669,700 |  | 6/1987 | Seidel . |
| 5,148,829 | * | 9/1992 | Deville ........................ 251/129.04 X |
| 5,174,335 |  | 12/1992 | Iwabuchi . |
| 5,191,912 |  | 3/1993 | McDaniel . |
| 5,247,802 | * | 9/1993 | Maniez et al. ............................ 62/77 |
| 5,263,679 |  | 11/1993 | Bushnell . |
| 5,333,833 | * | 8/1994 | Reinicke .................... 251/129.04 X |
| 5,346,173 |  | 9/1994 | Rasmusson . |
| 5,395,090 |  | 3/1995 | Rosaen . |
| 5,397,100 |  | 3/1995 | Miller . |
| 5,417,083 |  | 5/1995 | Eber . |

* cited by examiner

Primary Examiner—Gregory L. Huson
Assistant Examiner—Kathleen J. Prunner
(74) Attorney, Agent, or Firm—Harness, Dickey & Pierce, P.L.C.

(57) ABSTRACT

An incrementally positionable ball valve for use in the fluid circuit of a refrigeration or air conditioning system which can be remotely controlled by a low amperage control signal is disclosed. The ball valve harnesses the pressurized refrigerant from the fluid circuit in which it is installed as the primary power medium to actuate the valve. A sensor provides feedback to a controller relating to the incremental position of the valve. The controller then controls the operation of the valve in accordance with predetermined criteria. In another embodiment, the ball valve incorporates locator detents so that its incremental position can be determined by an operator manually controlling the valve. In still another aspect of the invention, a restrictor is provided for varying the flow capacity of the valve.

14 Claims, 6 Drawing Sheets

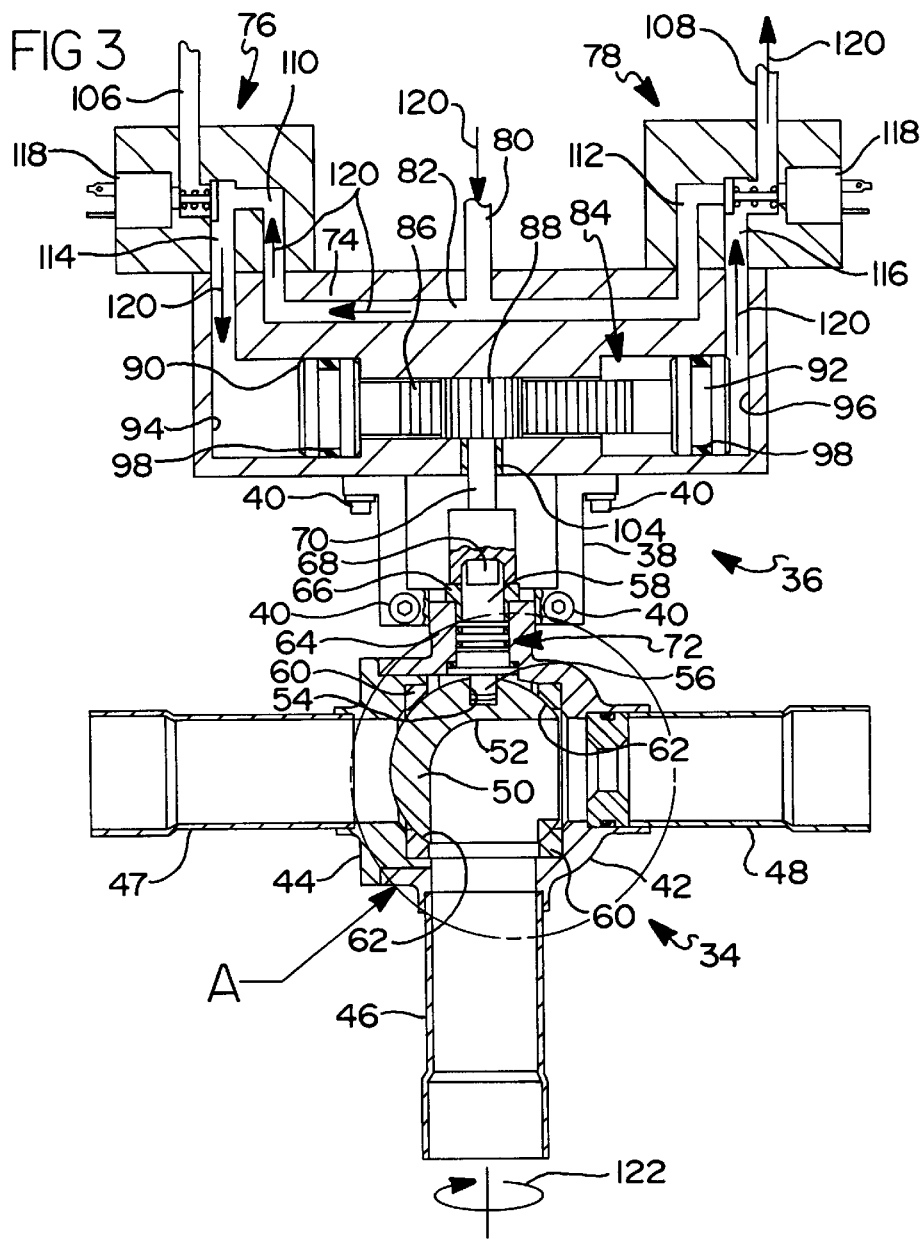
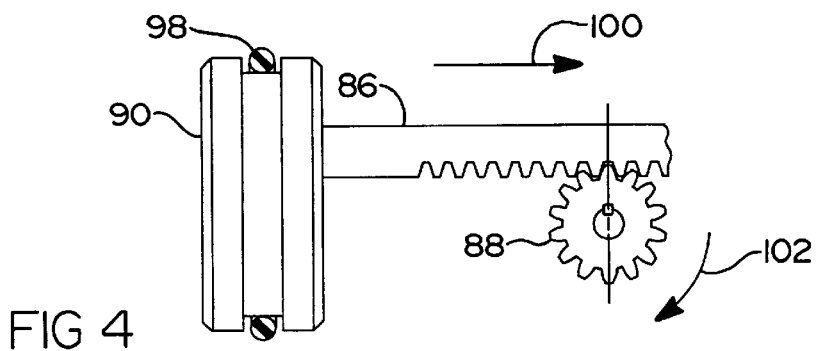

INCREMENTALLY POSITIONABLE BALL VALVE

CROSS-REFERENCE TO RELATED APPLICATION

This application is a continuation-in-part of U.S. Patent application Ser. No. 08/602,619 filed Feb. 16, 1996, now U.S. Pat. No. 5,810,326 issued Sep. 22, 1998. The entire disclosure of this prior application is considered part of the disclosure of this application and is hereby incorporated by reference herein.

BACKGROUND OF THE INVENTION

1. Field of the Invention

The present invention relates generally to valves for use in the fluid circuits of refrigeration and air conditioning systems and, more particularly, to ball valves used as compressor valves, line service valves or expansion valves, incorporating means to achieve incremental valve actuation.

2. Discussion

To significantly improve the overall energy efficiency of a refrigeration or air conditioning system and to minimize the unwanted release of refrigerant from the fluid circuit to atmosphere, it has been considered important to be able to remotely control the actuation, including incremental actuation, of system components, including compressor valves, line service valves and expansion valves.

To this end, modest attempts have been made to design remotely controlled or actuated valves for use in the fluid circuits of refrigeration and air conditioning systems.

One example of an actuated valve which has seen widespread use in the refrigeration and air conditioning industry for remotely controlling the flow of refrigerant through a fluid circuit is a solenoid-operated globe-type valve and is generally illustrated in prior art FIG. 1.

The valve 200 includes a body member 202 having a first and a second fluid passage 204, 206 running therethrough which, when combined, provide a fluid passage through the entire valve 200. Standard fluid fittings 208 located at the ends of the first and second fluid passages 204, 206 enable the valve 200 to be easily installed in a fluid circuit. Disposed between the first and second fluid passages 204, 206 at an upper portion 210 of the body member 202 is a solenoid 212. The solenoid 212 is affixed to the body member 202 by any of several suitable means, such as welding, brazing or soldering, as generally indicated at 214, or with a threaded connection. The solenoid 212 includes a plunger operator 216 which is disposed for linear movement within the valve body 202 upon energization of the solenoid 212. At one end of the plunger operator 216 is a globe type plug or closure element 218 that is operable to completely shut off the fluid passage 204 when in the closed position. A spring member 220 is placed about the plunger operator 216 and biased against the closure element 218. The plunger operator 216 is linearly positionable between a closed position (not shown) and an opened position (as shown in FIG. 1) when the solenoid 212 is energized from its de-activated state. In the opened position, the closure element 218 is withdrawn from the valve seat 222 by the electromagnetic force generated in the solenoid 212, overcoming the bias of the spring member 220. Fluid is then free to flow through the fluid passages 204, 206 of the valve as indicated by arrows 224. In the closed position, the solenoid 212 is deactivated and the biasing force of the spring member 220 causes the closure element 218 to advance into the fluid passage 204 and into engagement against the valve seat 222. When closed, fluid flow through the valve 200 is prohibited.

It is significant to note that, as illustrated in FIG. 1, even when the valve is in the opened position, the closure element of the solenoid valve remains at least partially protruding into the fluid flow stream. Because of this inherent design feature, blockage or interference within the fluid passage is created and, the fluid flow through the valve becomes turbulent, resulting in an increased pressure drop across the valve. The pressure drop, in turn, reduces the efficiency of the valve by allowing a significant amount of energy to be lost from the refrigeration circuit. Consequently, this energy loss presents a design constraint that must be addressed by refrigeration and air conditioning system designers and engineers as they develop refrigeration and air conditioning systems. Often, to compensate for the energy loss, system designers and engineers specify larger, over-sized compressors which exceed the thermodynamic requirements of the refrigeration system application. The use of such oversized compressors is inefficient and a waste of energy.

Solenoid-actuated valves which have been used in the prior art also present other difficulties. One problem results from the fact that there is no control over the speed at which the valve is closed because the switching of the valve between its opened and closed positions occurs nearly instantaneously. As such, the potential exists for the creation of a detrimental condition within the fluid circuit known as a "fluid hammer" effect. When a valve is closed too quickly, a "fluid hammer" caused by the force of the moving fluid against the closure element, can create a significant, momentary spike in the fluid pressure within the valve, often times substantially exceeding the pressure capacity for the valve. In many cases, cracks or breaks which are brought on in the fluid lines by a fluid hammer result in the undesirable loss of refrigerant to atmosphere. In some extreme situations, the fluid hammer effect could cause the valve, itself, to break apart creating an undesirable result.

Also, solenoid-actuated valves typically require a considerable draw of electrical current for their operation. As can be readily appreciated, the closure element of the solenoid-actuated valve must be sufficiently biased by the spring member in order to overcome the force of the pressurized fluid in the circuit and to engage the valve seat to prohibit the flow of fluid through the valve. In turn, the electromagnetic force generated by the solenoid must overcome the spring bias in order to open the valve. This requires that a sufficient amount of electrical energy be received at the solenoid from a remote power source. The amount of energy necessary to operate a solenoid-actuated valve of this type is on the order of 10–12 amps.

Consequently, any efficiency gains to the fluid circuit that are attributable to remote control of the solenoid-actuated valve are more than offset by the efficiency reductions due to the inherent energy losses resulting from flow turbulence and substantial pressure drop across the globe-type valve, the increased operating costs associated with the cost of the valve as well as with the energy required for operation of the valve and, finally, the concerns that could be generated as a result of the occurrence of the "fluid hammer" effect.

For these reasons, ball valves are generally preferred for applications in refrigeration and air conditioning fluid circuits because, among other advantages, they exhibit high efficiency fluid flow characteristics and they allow some degree of control over the speed at which the valve is closed. However, the ball valves used in refrigeration and air conditioning systems today, including compressor valves and line service valves, are primarily (if not exclusively) manually operated.

Attempts have also been made to design a remotely controlled, actuated ball valve for use in refrigeration and air conditioning systems. However, no mechanism for the efficient, controlled actuation of a ball valve disposed within a fluid circuit has, as yet, been embraced by the refrigeration and air conditioning industry.

One prior art actuated ball valve comprised an electric, motor-driven actuation mechanism employing a worm gear. The worm gear, in turn, drove a pinion connected to a stem operator of the ball valve. A limit switch controlling the revolutions of the motor (and worm gear) consequently controlled the rotation of the ball valve between the opened position and the closed position. However, this type of actuated ball valve has not received widespread acceptance in the refrigeration and air conditioning industry for several reasons. One reason is that the amount of torque required to cycle the ball valve between the opened and closed positions necessitates an electric motor having a high amperage electrical draw (e.g. on the order of 15 amps), thereby significantly increasing the power requirements for actuation of the valve. In addition, because the components of these prior actuated ball valves were not optimally designed to operate with one another, additional components were necessary to interface a controller to the actuation unit, increasing the cost and complexity of the actuated valve. In short, such prior art actuated ball valves are cost prohibitive.

It is, therefore, an objective of the present invention to provide a ball valve for use in the fluid circuit of a refrigeration or air conditioning system, that provides an efficient and cost effective means for controlling the incremental actuation of the ball valve.

It is another objective of the present invention to provide such an actuated ball valve that exhibits significantly improved fluid flow over prior art actuated valves.

It is still another objective of the present invention to provide such an actuated ball valve which reduces or eliminates the potential for creating the "fluid hammer" effect within the fluid circuit.

It is a further objective of the present invention to provide such an actuated ball valve which harnesses the power of the pressurized refrigerant in the fluid circuit as the primary power medium to achieve valve actuation.

It is yet an additional objective of the present invention to provide such an actuated ball valve which can be directly coupled to a remote control system, such as a microprocessor, which generates control signals on the order of milli-amps.

SUMMARY OF THE INVENTION

Accordingly, one embodiment of the present invention is directed to a refrigerant powered actuated ball valve for use in the fluid circuit of a refrigeration or air conditioning system, which can be remotely controlled by a low amperage control signal. The actuated ball valve harnesses the pressurized refrigerant from the fluid circuit in which it is installed as the primary power medium to achieve valve actuation. Actuation of the valve can be controlled such that the valve is incrementally positionable between first and second positions.

The actuated ball valve generally includes a ball valve and an actuation means. The actuation means has a manifold having an inlet port which is in constant fluid communication with a high-pressure side of the fluid circuit. Pressurized refrigerant supplied to the manifold is branched to a series of fluid channels running through the manifold. Two exhaust port operators are mounted in conjunction with the manifold. Each exhaust port operator has an outlet or exhaust port that connects the actuation means to the low-pressure side of the fluid circuit. In addition, each is capable of directing the flow of pressurized refrigerant to either the exhaust port or the series of fluid channels running through the manifold. A reciprocal member, such as a rack gear, is disposed for linear movement within a chamber in the manifold. A pinion member engages the reciprocal member such that a linear displacement of the reciprocal member causes a corresponding angular displacement of the pinion member. A linear displacement is achieved when the pressurized refrigerant is applied to the reciprocal member thereby causing a stem operator on the ball valve to rotate, cycling the ball valve between a first position and a second position. A sensor monitors the incremental position of the valve between a first and second position and provides the controller with a signal corresponding to the valve position. The controller can thereby control the incremental position of the valve according to a predetermined set of parameters.

In another embodiment of the invention, a manually operated ball valve is incrementally positionable by means of a plunger that is engagable with a plurality of locator indentations that are discretely located in the surface of the ball member. As the valve is operated, the operator can control the incremental actuation of the valve by rotating the valve so that the plunger is engaged in a desired one of the locator indentations.

In yet another aspect of the invention, a restrictor can be included in the ball valve to alter the flow capacity of the valve to accommodate the requirements of many different fluid circuits without the necessity of producing many different sized ball valves.

The ball valve of the present invention substantially improves the energy efficiency over the prior art actuated valves used in refrigeration and air conditioning systems. The present actuated ball valve, thus, contributes to the increase in efficiency of the refrigeration or air conditioning system as a whole, permitting greater refrigeration and air conditioning system performance and improved energy efficiency ratings. This will, in turn, lower the acquisition, operation and maintenance costs of such systems by virtue of the ability to reduce energy consumption, as well as the size and/or number of compressors and other components required for a given refrigeration or air conditioning application.

BRIEF DESCRIPTION OF THE DRAWINGS

The various advantages of the present invention will become apparent to one skilled in the art upon reading the following description of the preferred embodiments, in which:

FIG. 3 represents a simplified transverse cross-sectional view of an actuated ball valve of the type for use in the fluid circuit of a refrigeration or air conditioning system and constructed according to the teachings and principles of a first embodiment of the present invention;

FIG. 4 is an enlarged fragmentary detail view showing a preferred rack and pinion arrangement of the actuation means of the actuated ball valve of FIG. 3;

FIG. 7 is an enlarged detail view, partially in cross-section, of the rotary ball member of the ball valve of yet another embodiment of the present invention having a plunger as the valve is being rotated between;

DESCRIPTION OF THE PREFERRED EMBODIMENTS

Figure 1:
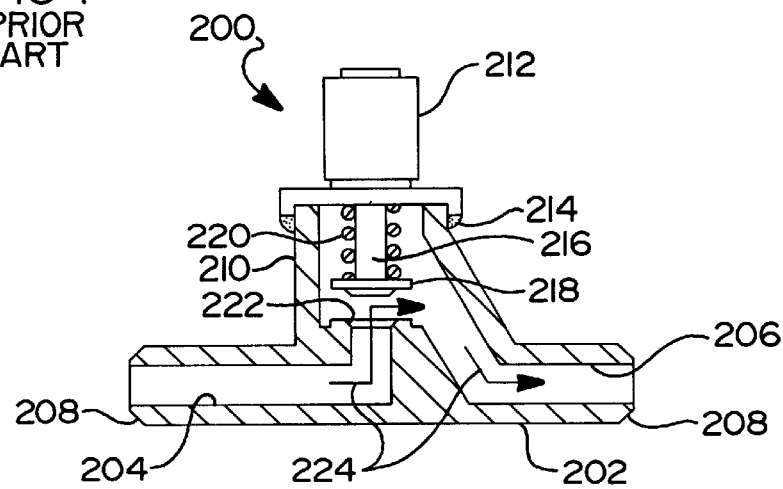
FIG. 1 depicts a transverse cross-sectional view of a prior art solenoidactuated globe-type valve for use in the fluid circuit of a refrigeration or air conditioning system, shown in the opened position.

It should be understood from the outset that while the drawings and the following discussion relate to particular embodiments of the present invention, these embodiments merely encompass what is presently regarded as the best mode of practicing the invention and other modifications may be made to the particular embodiments without departing from the spirit and scope of the invention.

Referring now to FIGS. 2–7, a refrigerant driven actuated ball valve 10 of the present invention is shown and described. As illustrated in the schematic plan view of FIG. 2, an actuated ball valve 10 is installed in a fluid circuit 12 of a refrigeration or air conditioning system. In addition to the actuated ball valve 10 of the present invention, the fluid circuit 12 is also shown to generally include a compressor 14, a condenser 16, an expansion valve 18 and an evaporator 20. Arrows 22 indicate the direction of fluid flow through the circuit 12. A controller 24 for controlling the operation of the actuated ball valve 10, which could comprise either a simple switch, such as a pressure transducer or thermostat, or a computer, such as a microprocessor or a programmable logic controller, to name a few, is generally indicated at 24.

As is well-known, the operating fluid (i.e. refrigerant) of a refrigeration or air conditioning system flows through the fluid circuit 12 under pressure, which varies depending upon where in the fluid circuit 12 the operating fluid is located. For example, the refrigerant is subjected to a lower pressure at the input side of the compressor 14 and a higher pressure at the discharge side of the compressor 14. Consequently, the individual portions of the fluid circuit generally indicated at 26 and 28 can be referenced with greater particularity with the terms "low pressure side," or simply "low side," and "high pressure side," or simply "high side," respectively.

Figure 2:
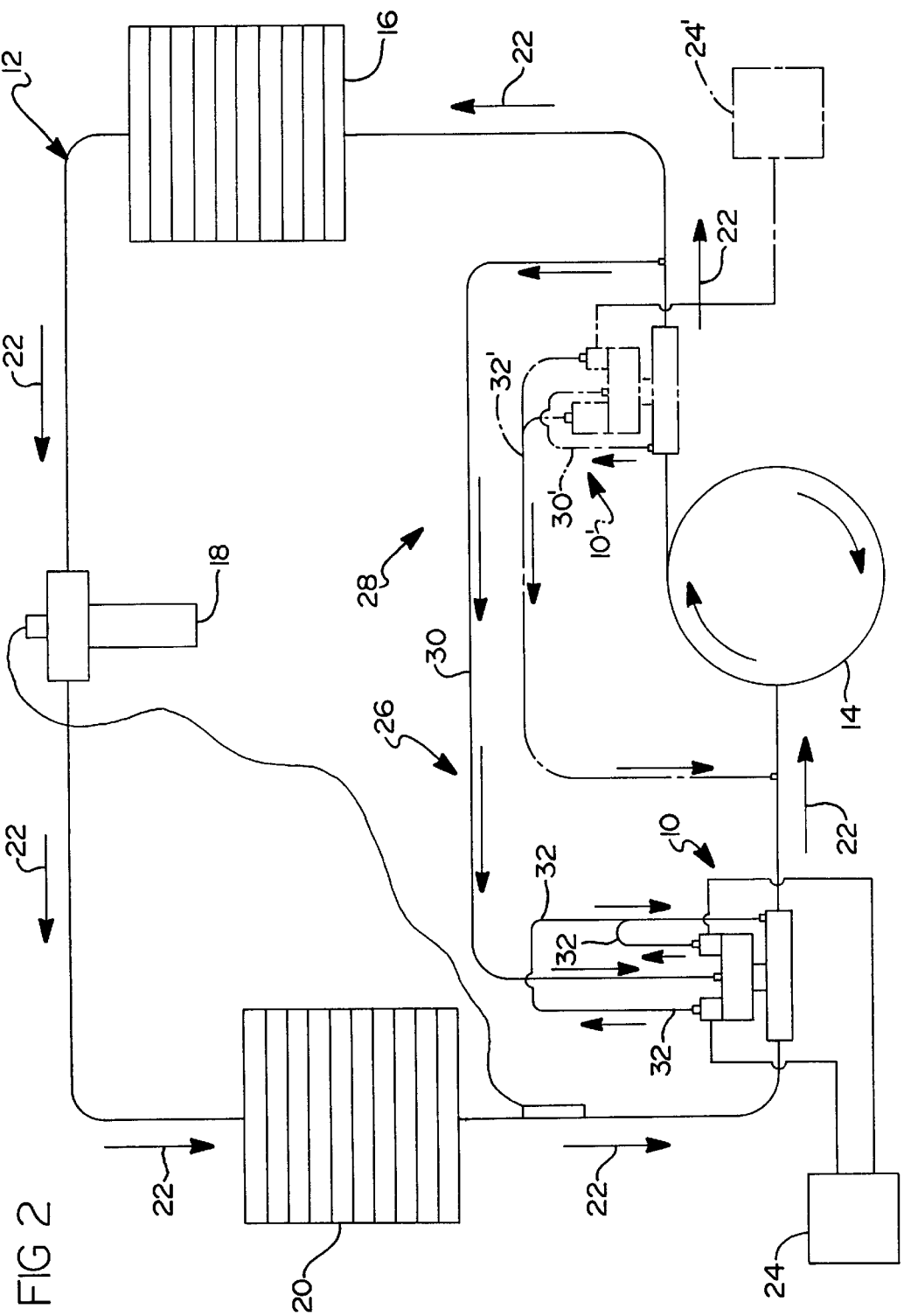
FIG. 2 is a schematic plan view of a fluid circuit of the type for use in a refrigeration or air conditioning system including a schematic representation of a refrigerant powered actuated ball valve constructed according to the teachings and principles of the present invention shown both in a first location (solid lines) and in an alternate location (phantom lines)
Figure 6:
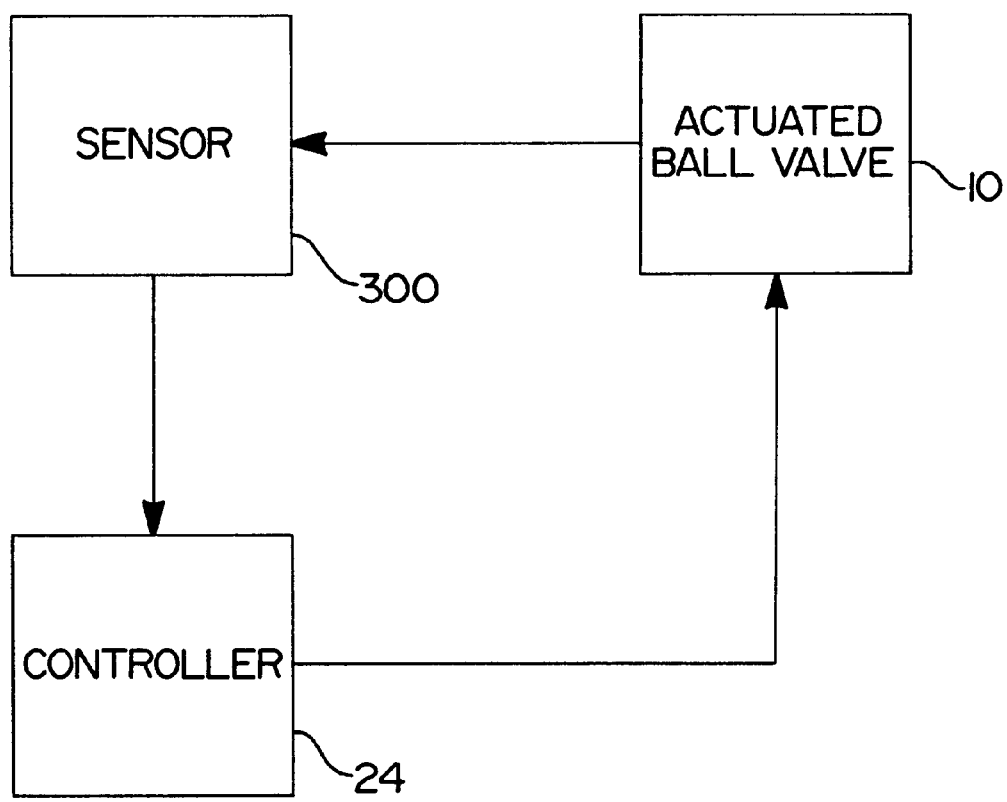
FIG. 6 is a simplified block diagram showing the relationship between the actuated ball valve, the sensor and controller.

The actuated ball valve 10 of the present invention can be disposed on either the high pressure side 28 or the low pressure side 26 of the fluid circuit 12 as shown in FIG. 2, with the schematic representation of a first embodiment of the actuated ball valve 10 disposed in the low side 26 of the fluid circuit 12 and a second embodiment of the present invention 10' (shown in phantom lines) being depicted in the high side 28 of the fluid circuit 12. Regardless of the particular location of the actuated ball valve 10, 10', separate fluid line connections 30, 30', 32, 32' are provided between the valve and both the high side 28 and low side 26 of the fluid circuit 12. The fluid connections 30, 30', 32, 32' can be achieved by any of a variety of standard fluid line connections, including face seal fittings, flange fittings, flare fittings, pipe fittings and soldered fittings, to name a few, all of which are well-known in the industry. However, it is contemplated that the preferred embodiment of the present invention would incorporate a one-quarter inch (¼") diameter fluid connection having a flare fitting.

With particular reference now FIGS. 3 and 4, a refrigerant powered actuated ball valve 10 that is constructed according to a first embodiment of the present invention is shown in greater detail. The actuated ball valve 10 generally includes a ball valve 34 and an actuator means 36 for carrying out the instructions commanded by a controller 24. The ball valve 34 and the actuator 36 are assembled for operation by means of a connection bracket 38 and threaded fasteners 40. This arrangement enables the ball valve 34 and/or actuator 36 to be disassembled for ease of replacement, service or repair. Alternatively, the connection bracket 38 can be permanently assembled to the ball valve 34 and/or actuator 36 by any other suitable fastening means, such as welding.

Figure 5:
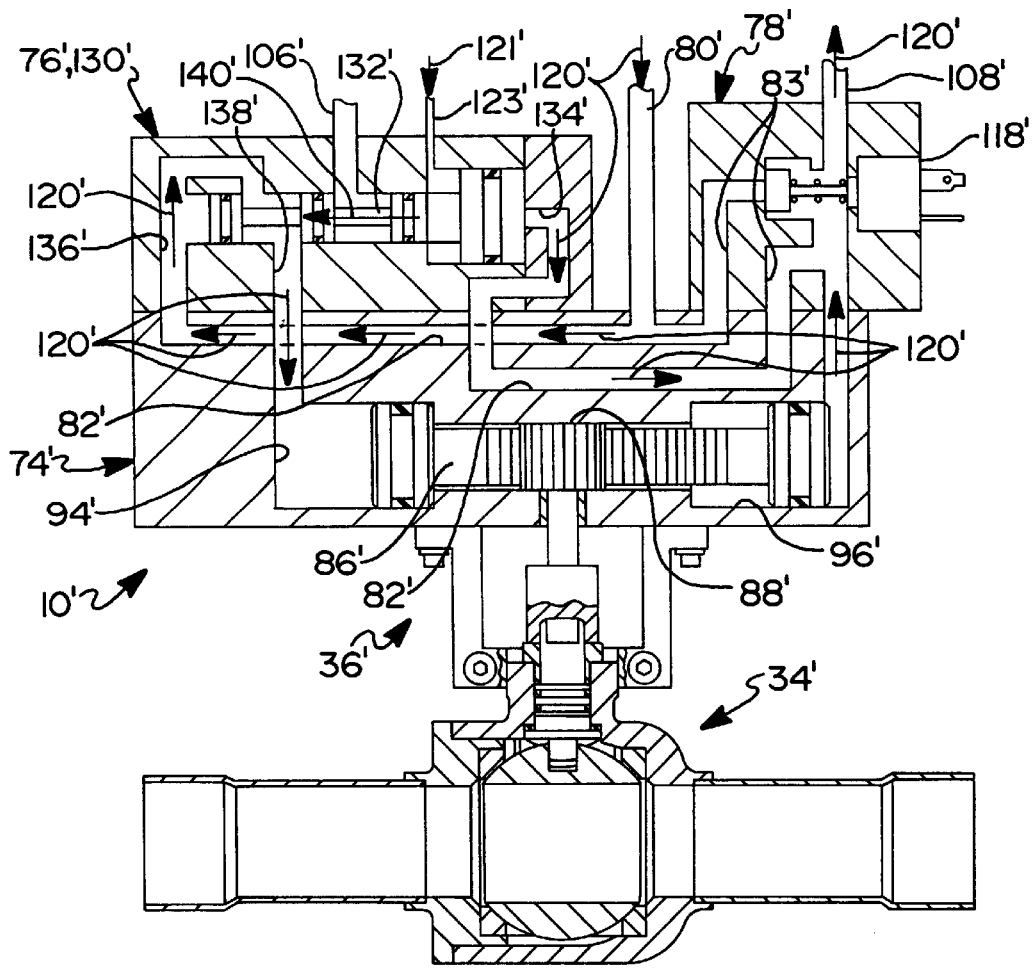
FIG. 5 represents a simplified transverse cross-sectional view of an actuated ball valve of the type for use in the fluid circuit of a refrigeration or air conditioning system and constructed according to the teachings and principles of a second embodiment of the present invention.

The ball valve 34 employed in the actuated ball valve 10 of the present invention can be any one of a number of different types of ball valves, such as a straight through or bidirectional ball valve 34', as shown in FIG. 5, a 90° ball valve or a three-way valve 34 for multiple flow path fluid circuits, as illustrated in the FIG. 2. Further, the ball valve 34 employed in the present invention can comprise a ball valve such as that disclosed in U.S. Pat. No. 5,397,100 to Kent A. Miller and assigned to the assignee of the present invention, the teachings of which are hereby explicitly incorporated by reference. Of course it is appreciated that the particular type of ball valve 34 employed in the present invention depends on the requirements of the fluid circuit 12 in which it is installed and the scope of present invention is not intended to be limited to any one model of ball valve.

Furthermore, the preferred embodiment of the present invention contemplates incorporating a ball valve 34 which can range in size from one-quarter of an inch (¼") to upwards of three and one-eighths inches (3⅛") or more.

Referring now to the ball valve 34 shown in FIG. 3, the ball valve 34 generally incorporates a body section 42 and tail section 44. Fluid line connector portions 46, 47 and 48 serve to connect the ball valve 34 to the fluid circuit 12 of a refrigeration system. The fluid line connector portions 46, 47 and 48 may be compatible with any of a variety of standard fluid line connections, including face seal fittings, flange fittings, flare fittings, pipe fittings and soldered fittings, to name a few, all of which are well-known in the industry. The body section 42 and the tail section 44 of the ball valve 34 are alignably connectable to one another, such as by a threaded engagement to form a unitary valve body after the installation and assembly of the ball valve's 34 internal components has been completed. A sealed connection between the body section 42 and the tail section 44 can be achieved by any suitable method, such as welding, brazing, soldering or the like. Although the body of the ball valve 34 has been described as having a multi-component construction including the body section 42 and the tail section 44, it should be appreciated that the body of the ball valve 34 may also be manufactured as a single component.

Also shown in FIG. 3, a generally spherically-shaped closure element or rotary ball member 50 is disposed between the body section 42 and the tail section 44. The rotary ball member 50 includes a port or fluid passage 52 that is operable to communicate alternately with the fluid line connector portions 46 and 48 when the ball valve 34 is in a first opened position and fluid line connector portions 46 and 47 when the ball valve is in a second opened position (not shown). The fluid passage 52 is sized to be substantially equal to or even slightly greater than the size of the fluid lines that ball valve 34 is intended to service. The rotary ball member 50 also includes a slot 54 for receiving a stem head 56 of a ball stem 58.

Ball seals 60 are disposed within the body section 42 and tail section 44 of the ball valve 34 adjacent to the rotary ball member 50. The ball seals 60 serve to provide a seat 62 against which the rotary ball member 50 may be sealed. The ball seals 60 may be made from any suitable material, carbon-filled teflon being one example.

A primary stem operator or ball stem 58 is included in the ball valve 34 and is operable to be moved between, and therefore provide the ball valve 34 with a first opened position and a second open position. The ball stem 58 is operable to rotate the rotary ball member 50 through approximately ninety degrees (90°) of travel to facilitate the positions of the ball valve 34. The ball stem 58 is rotatably supported in the body section 42 at a neck portion 64 by a bearing member 66. A first stem head 56, located at one end of the ball stem 58, engages a slot 54 in the rotary ball member 50 for rotating the ball member 50 as the ball stem 58 is likewise rotated, as will be further described herein. The opposite end of the ball stem 58 includes a second stem head 68 which engages a pinion stem 70 in a similar manner as has already been described with respect to the ball stem 58 and rotary ball member 50 connection.

O-ring seals, generally indicated at 72, are located between the neck portion 64 and the ball stem 58 and serve to provide a fluid-tight seal between the neck portion 64 (and therefore the body section) 42 and the ball stem 58, while still allowing the ball stem 58 to be freely rotatably supported therein. The preferred sealing arrangement raises the ball valve 34 to a zero-leakage system. However, less stringent alternative sealing arrangements may be used with the ball valve 34, if desired.

The actuator 36 of a first embodiment of the actuated ball valve 10 of the present invention is represented in FIGS. 3 and 4. The actuator 36 is shown to generally include a block manifold 74 and two exhaust port operators 76, 78. A simplified representation of a cross section of the actuator 36 is shown in FIG. 3.

The block manifold 74 includes an inlet port 80 that connects the actuator 36 with the fluid line 30 originating on the high side of the fluid circuit 12 in which the actuated ball valve 10 is installed, as shown in FIG. 2 and previously described. The inlet port 80 provides a constant source of pressurized refrigerant from the high side 28 of the fluid circuit 12 to the block manifold 74. A series of fluid channels 82 run within the block manifold 74 to facilitate the flow of pressurized refrigerant through the actuator 36, as will be further described. In addition, disposed within a chamber in the block manifold 74, generally indicated at 84, is a rack 86 and pinion 88 arrangement which serves to convert the power of the pressurized refrigerant into a mechanical force (i.e. a torque) that is necessary to drive the stem operator 58 on the ball valve 34, and hence the rotary ball member 50, between the ball valve's 34 opened and closed positions.

While in the preferred embodiment the block manifold 74 is manufactured in a machining operation from aluminum, it is contemplated that other suitable precision valve construction materials such as steel, molded plastic, or the like could also be utilized.

With particular reference to FIGS. 3 and 4, the rack 88 is operable to be linearly displaceable within the chamber 84 of the block manifold 74 in a lateral direction as viewed in FIGS. 3 and 4. Located on opposite ends of the rack 86 are piston members 90, 92. Piston members 90, 92 are disposed in fluid reservoirs 94, 96 on opposite ends of the block manifold 74. Seals 98 on each piston member 90, 92 prohibit the transfer of refrigerant from the reservoirs 94, 96 into the chamber 84 in which the rack 86 and pinion 88 arrangement is located.

FIG. 4 shows a fragmented plan view of the rack 86 and pinion 88 arrangement. As depicted, linear displacement of the rack 86 in the direction of arrow 100, results in a corresponding angular displacement of pinion 88 in the direction of arrow 102. It should be appreciated that the precise dimensions for the rack 86 and pinion 88 components (e.g., length, diameter, gear pitch, etc.) are a function of the necessary rotation for the rotary ball member 50 and any dimensional constraints that may be imposed upon the actuated ball valve 10.

Although a rack 86 and pinion 88 arrangement is the preferred embodiment, other means to convert the power of the pressurized refrigerant into an angular rotation of the rotary ball member 50 of the ball valve 34 could also be utilized. For example, a rotary vane-type actuator could be employed with the actuation means of the present invention.

A pinion stem 70 fixed to the pinion 88, extends downward from the pinion 88 and through the block manifold 74 into engagement with the stem operator 58 of the ball valve 34 as previously described. As such, rotation of the pinion 88 and pinion stem 70, in turn, acts to rotate the stem operator 58 of the ball valve 34. Bearing means 104 for the pinion stem 70 can be provided at the base of the block manifold 74. A suitable material for the construction of the rack 86 and pinion 88 is case hardened, carbon steel, or the like.

Mounted by any suitable method on top of the block manifold on opposite sides are two exhaust port operators 76, 78. The exhaust port operators 76, 78 each include an outlet port 106, 108 that is in fluid communication with the low side 26 of the fluid circuit 12, as shown in FIG. 2. In addition, each exhaust port operator 76, 78 includes an inlet port 110, 112 and an outlet port 114, 116 that are in fluid communication with the fluid channels 82 of the block manifold 74, substantially as represented in FIG. 3. A solenoid 118 in each exhaust port operator functions 76, 78 as a valve to control the channeling of refrigerant into and out of the exhaust port operator 76, 78 according to command signals given by the control means 24. However, unlike prior art solenoid actuated valves 200, the solenoids 118 in the actuator 36 of the present invention do not require a substantial draw of electrical current to operate because the size of the fluid line that each is servicing is very small, e.g. on the order of one-quarter inch (¼"). In fact, these solenoids 118 require a current on the order of 6–10 milli-amps to operate. This, in turn, enables the actuator 36 of the present invention to communicate (electronically) directly with the controller 24, a significant cost and efficiency advantage over prior art actuated valves.

Operation of the actuated ball valve 10 can be understood with particular reference to FIGS. 2 and 3, where the flow of refrigerant from the fluid circuit 12 is indicated by arrows 120. As depicted in FIG. 3, the ball valve 34 is shown in the an opened position. The following describes operation of the actuated ball valve 10 upon command by the controller 24 to open the ball valve 34 and establish fluid communication between fluid line connector portions 46 and 48 by rotating the rotary ball member 50 in a clockwise direction as indicated by arrow 122.

Controller 24 provides the solenoid 118 of exhaust port operator 76 with a milli-amp signal that is sufficient to energize the solenoid 118, thereby causing the outlet port 106 to be closed and allowing the pressurized refrigerant to pass into the reservoir 94 in the block manifold 74. However, the solenoid 118 of exhaust port operator 78 is not energized, thereby preventing pressurized refrigerant from entering reservoir 96 while simultaneously opening the outlet port 108 and enabling refrigerant to vent from the reservoir 96. The force of the pressurized refrigerant acting on the piston member 90 causes the rack 86 to be displaced in the direction as indicated by arrow 100 (FIG. 4). As best seen in FIG. 4, linear displacement of the rack 86 drives a corresponding angular displacement or rotation of the pinion 88. Finally, as already described, rotation of the pinion 88 results in a corresponding rotation of the rotary ball member 50 in the ball valve 34. Rotation of the ball valve 34 in the reverse direction is easily inferred from the above description.

It should be appreciated that in the first embodiment of the present invention, the exhaust port operator 76, 78 solenoids 118 can be designed and arranged such that, in the event of a loss of power, the ball valve 34 would return to a nominal position as desired (e.g., either opened or closed) when both solenoids 118 are de-energized. Alternatively, as depicted in FIG. 3, the solenoids can be arranged such that, in the event of a power failure, the ball valve 34 would remain in its present state at the time of the loss of power. In addition, a manual override (not shown) can be included to cycle the ball valve 34 between opened and closed positions in the event of a loss of either electric or fluid power.

Furthermore, the elapsed time for rotation of the rotary ball member 50 when the ball valve 34 is actuated (i.e. the time required to fully cycle the ball valve 34 between an open and closed position) can be controlled. Such control, which is unavailable with the prior art solenoid-actuated valves 200, significantly assists in the prevention of the "fluid hammer" effect previously described.

Additionally, the valve is incrementally positionable between a first and second position. As diagrammatically illustrated in FIG. 6, a sensor 300 is associated with the actuated ball valve 10 to detect the position of the rotary ball member 50. The sensor 300 serves as a feedback device and provides input to the controller 24 which, in turn, controls the operation of the actuator 36.

The sensor 300 can comprise any of a number of position sensing devices, such as an encoder, Hall effects sensor, magnetic pickup or potentiometer, that can be coupled to the actuator 36 and/or ball valve 34 to generate a response corresponding to the incremental position of the ball valve 34. The controller 24, in turn, can incorporate a predetermined table of parameters that relates the incremental position of the valve 34 to various flow conditions or other operating conditions of the valve 34.

In such a manner, the controller can control the incremental position of the valve in accordance with conditions present in the fluid circuit. It is therefore believed that the incrementally positionable ball valve of the present invention is especially suited to be employed as an expansion valve in a fluid circuit.

Turning now to FIG. 5, an alternate and preferred embodiment of the actuated ball valve 10' of the present invention is depicted in a simplified drawing. Although the embodiment shown in FIG. 5 includes a different type of ball valve 34' than the one shown in FIG. 3, the preference toward the second embodiment of the present invention centers around the construction of the actuator 36'. Consequently, the type of ball valve 34' illustrated in FIG. 5 is not necessarily "preferred" over any other type of ball valve described herein or elsewhere.

Similar to the first embodiment of the actuated ball valve, the preferred embodiment of the actuator 36' of the present invention includes a block manifold 74' having an inlet port 80' that is in constant fluid communication with the high side 28 of the fluid circuit 12 in which the valve is located. Also similar to the previous embodiment, the actuator 36' employs a rack 86' and pinion 88' arrangement that is disposed within the block manifold 74' for the conversion of the refrigerant power and ultimate operation of the ball valve's stem operator.

Two exhaust port operators 76', 78' are mounted by a suitable method to opposite sides on top of the block manifold 74'. The exhaust port operators 76', 78' each include an outlet port 106', 108' that is in fluid communication with the low side 26 of the fluid circuit 12 and additional fluid ports 83', 134', 136' and 138' that are in communication with fluid ports 82' in the block manifold 74', substantially as depicted in FIG. 5. A first exhaust port operator 78' includes a solenoid operated valve 118', generally similar to that previously disclosed. However, a second exhaust port operator 76' comprises a pilot valve or reversing valve 130'.

The reversing valve 130' is shown as a balanced, multi-ported spool valve. As is well-known, equal fluid pressures acting on opposite sides of the spool 132' will cause the valve to return to a predetermined or "balanced" position. However, in FIG. 5, the reversing valve 130' is shown in its "out-of-balance" position.

Operation of the preferred actuator 36' of the present invention to cycle the ball valve 34' to the closed position, as shown in FIG. 5, in response to a command by the controller 24' is described as follows, with the flow of refrigerant being indicated by arrows 120'.

Controller 24' de-energizes the exhaust port solenoid 118' thereby prohibiting pressurized refrigerant from traveling to the reservoir 96' and to a first port 134' in the reversing valve 130'. Simultaneously, exhaust port outlet 108' is opened and refrigerant from the reservoir 96' and the first fluid port 134' is vented to the low side 26 of the fluid circuit 12. Constant pressurized refrigerant entering a second port 136' in the reversing valve 130', in combination with the evacuation of refrigerant from the first port 134' in the reversing valve 130', act to move the spool 132' of the reversing valve 130' to its "out-of-balance" position. Air is allowed to enter from the atmosphere, as indicated by arrow 121', through vent 123' to prevent a vacuum lock on the spool. As this occurs, pressurized refrigerant becomes free to flow into the reservoir 94' through port 138'. From this point, operation of the actuator 36' is identical to that previously described with respect to actuator 36.

To reverse the cycle of the ball valve 34' just described, controller 24' causes the exhaust port solenoid 118' to be energized, thereby allowing pressurized refrigerant to enter into the reservoir 96' and the first port 134' in the reversing valve 130'. With refrigerant of equal pressure entering both ends of the reversing valve 130', the reversing valve 130' will return to its balanced position. As this occurs, the spool 132' is displaced in the direction of arrow 140', causing the reservoir 94' to vent to the low side 26 of the fluid circuit 12 through the outlet port 106' and also closing the second port 136' to the reversing valve 130'. The resulting pressure differential between the reservoir 96' and the reservoir 94', ultimately causes rotation of the ball valve 34' as described above.

The actuated ball valve of the present invention can be used with the refrigerants commonly employed in the refrigeration and air conditioning industry, such as R-22, R-502, HP-62 and AZ-50 refrigerants. Furthermore, the present invention is not limited by the physical state of the refrigerant; that is, it does not matter to the operation of the present invention if the refrigerant is in a liquid, vapor or gaseous state. However, it is contemplated that, depending upon the size of the ball valve, the preferred operating pressure of the refrigerant is generally greater than 50 psig.

Yet another embodiment of the invention is incorporated in a manually operated ball valve 400 that is incrementally positionally between a first and second position. The manually operated ball valve 400 is similar to that disclosed in U.S. Pat. No. 5,397,100.

Figure 8:
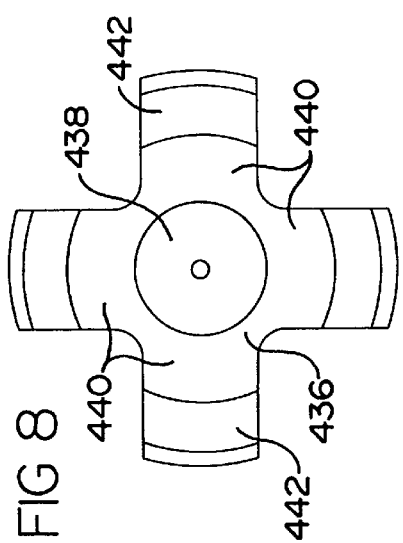
FIG. 8 is a plan view of the plunger of FIG. 7.
Figure 9:
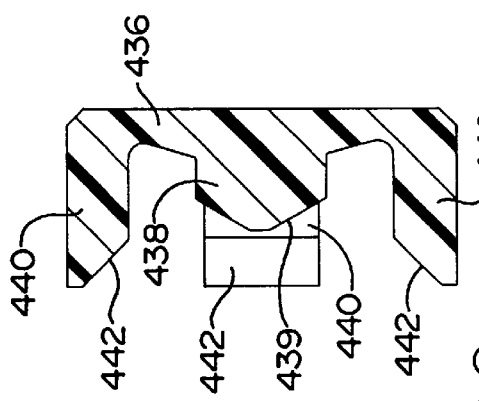
FIG. 9 is a transverse cross-sectional view of the plunger of FIG. 8.

Disposed within body section 412 on an opposite side of rotary ball member 424 from ball seal 434, a plunger 436 acts to center rotary ball member 424 within body 412 so that fluid passage 426 is properly aligned with fluid line connector portions 416 and 418. Plunger 436, shown in more detail in FIGS. 8 and 9, has a locator head 438 and a plurality of fingers or extension portions 440 each having a pad 442 for engaging the surface of rotary ball member 424. Pad 442 may be suitably contoured to better engage the generally spherical surface of rotary ball member 424. FIG. 8 illustrates plunger 436 as including four extension portions 440, that are arranged in opposite pairs and are located on perpendicular axes so that each extension portion 440 is spaced approximately ninety degrees (90°) apart. However, a plunger 436 for use with the present invention may employ any suitable number of extension portions 440 which may be more or less than four. Plunger 436 may further be provided in various configurations. Locator head 438, which protrudes from the center of the plunger 436, has a tapered or conically-shaped surface 439 which is operable to engage a plurality of locator indentations and groove 432 in the surface of rotary ball member 424. Extension portions 440 and locator head 438, in combination with locator indentations 428 and groove 432 serve to enable plunger 436 to center rotary ball member 424 within body section 412 and align fluid passage 426 with fluid line connector portions 416 and 418. Plunger 436 is preferably manufactured from a strong, flexible material that is able to maintain its from, fit and function over a wide spectrum of operating temperatures, ranging from approximately minus forty degrees Fahrenheit (−40°) to about four hundred degrees Fahrenheit (400° F). Thermoplastic polymer materials have proved suitable for this application.

Figure 10:
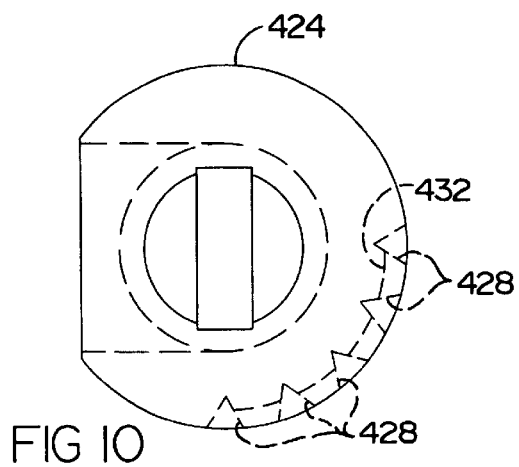
FIG. 10 is a plan view of a rotary ball member for the valve of FIG. 7.

Shown in greater detail in FIG. 10, rotary ball member 424 is shown to include five locator indentations 428, however, at least three are preferred and more may be employed as desired. In the preferred embodiment, the locator indentations 428 are conical in shape and spaced apart over approximately ninety degrees (90°). A shallow channel or V-groove 432 extends circumferentially in the surface of rotary ball member 424 between the locator indentations 428. As shown, the locator indentations 428 can be spaced apart at regular intervals, such as every 15 degrees, to provide for a plurality of incremental positions that result in predetermined flow characteristics through the valve as already described. Of course, the number of incremental locations is depending upon the desired flow characteristics sought to be obtained through the valve.

Figure 7:
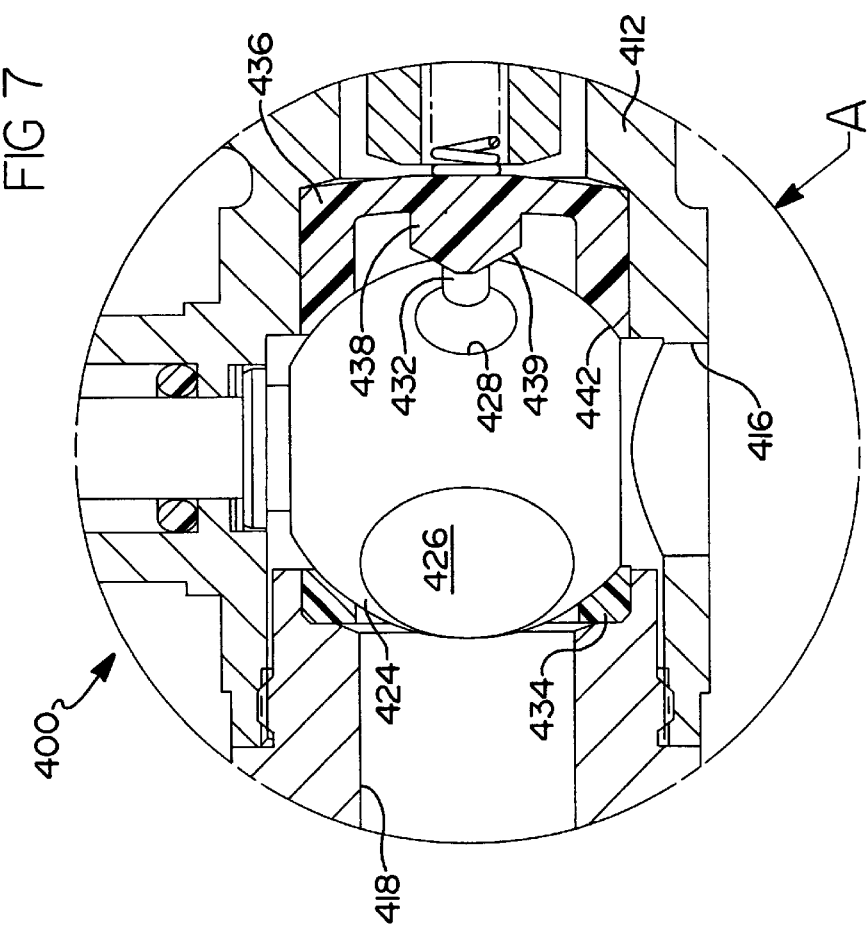

FIG. 7 illustrates in enlarged detail of the valve as the rotary ball member 424 is being moved between first and second positions. As rotary ball member 424 is rotated from one incremental position to another, for example, locator head 438 of plunger 436 is forced from its full engagement with one locator indentation and into full engagement with groove 432. As the locator head 438 moves from engagement with the locator indentation into engagement with the groove 432, locator head 438, which is in the center of plunger 436, is flexed or cammed outward. Locator head 438 continues to ride in a "flexed" state along groove 432 until rotation of rotary ball member 424 is terminated as desired, such as at any incremental position of the ball valve, or the full opened or closed position. Once at the desired position, locator head 438 returns to its normal, unflexed state as it "snaps back" and comes into full engagement with the associated locator indentation 428.

The ball valves of the present invention may be manufactured to accommodate various standard fluid line sizes and yet still incorporate many standard components. In addition, the ball valve can be readily produced with a variety of standard "footprints", such as a two-bolt flange surface found on typical compressor valves or any of the other fluid line connections commonly utilized, which facilitates the ability to retro-fit the present valve invention into existing fluid circuits. Further, standard sizes can be incorporated to further enable the interchangability of the various components of the ball valve.

Figure 11:
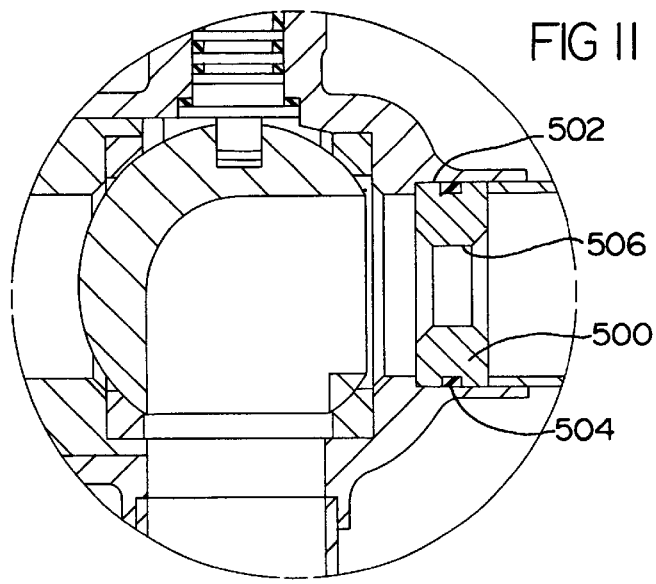
FIG. 11 is an enlarged view of detail A of FIG. 3.
Figure 12:
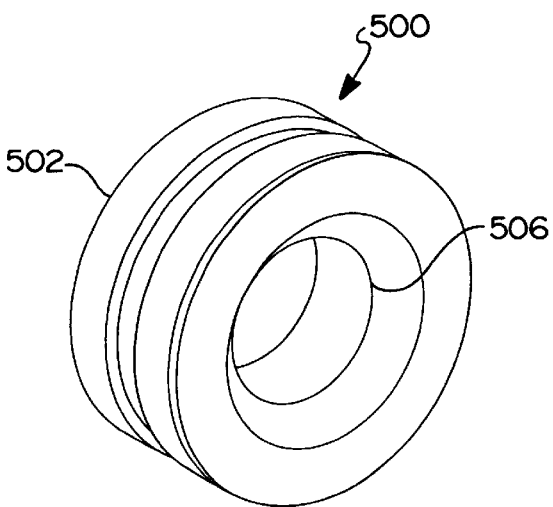
FIG. 12 is an enlarged perspective view of a restrictor for use with the ball valves of the present invention.

To this end, a restrictor 500 may be included in the ball valve 34, as shown in FIGS. 11 and 12. The restrictor 500 serves to alter the flow capacity of the ball valve 34 to accommodate the requirements of many different fluid circuits, without the necessity of producing many different-sized ball valves. Thus, the components of the ball valve 34 can be standardized to achieve the economies of scale for manufacturing the ball valve 34.

The restrictor 500 is generally cylindrically-shaped and has an outer circumference 502, that is sized to fit snugly within the body section 42 of the ball valve 34. Seals 504, such as O-rings, may be incorporated between the body section 42 and the restrictor 500. The restrictor 500 is suitably fixed within and to the body section 42, such as by staking, welding, brazing or soldering.

An aperture or orifice 506 that has a diameter that is significantly smaller than its outer diameter extends through the restrictor 500. The orifice 506 serves to restrict the fluid flow through the valve 34 to a desired level, to thereby control the tonnage flow rating of the valve 34. Restrictors 500 having orifices 506 of many different diameters can then be used in the ball valve 34 to allow the ball valve to be used in different fluid circuits having unique flow requirements.

The restrictor 500 can be manufactured from any of a variety of materials that are suitable for use in the construction of precision valves, such as aluminum, brass, steel, or molded plastic.

It should be understood that while the present invention has been mainly discussed in the context of refrigeration and air conditioning systems, those of ordinary skill in the art will readily appreciate that the actuated valve 10 of the present invention may be utilized in any type of fluid circuit containing an operating fluid under pressure, such as any of a variety of commonly used fluids including air, water and steam, among others.

The present invention has been described in an illustrative manner. It is to be understood that the terminology which has been used is intended to be in the nature of words of description rather than of limitation. Many modifications or variations to the present invention are possible in light of the above teachings. Therefore, within the scope of the appended claims, the present invention may be practiced otherwise than as specifically described.

What is claimed is:

1. An incrementally positionable actuated ball valve for use in a fluid circuit of a refrigeration or air conditioning system containing an operating fluid under pressure and having a high-pressure side and a low-pressure side, said actuated ball valve comprising:

a ball valve comprising at least one fluid passage therethrough in combination with a valve actuator, said combination adapted to be disposed within said fluid circuit such that said fluid passage is in fluid communication with said fluid circuit;

a sensor operable to detect the incremental position of said ball valve; and a controller operable to control the incremental position of said ball valve; and wherein said valve actuator comprises:

a manifold having an inlet port adapted to be in constant fluid communication with said high-pressure side of said fluid circuit for supplying pressurized fluid from said fluid circuit to said valve actuator;

at least one exhaust port operator comprising an outlet port adapted to be in fluid communication with said low-pressure side of said fluid circuit and a valve operable to direct said pressurized fluid to either said outlet port or said manifold;

a reciprocal member disposed within said manifold for reciprocal displacement therein; and a pinion member cooperating with said reciprocal member such that a displacement of said reciprocal member causes a corresponding angular displacement of said pinion member, said pinion member also cooperating with a stem operator of said ball valve.

2. An actuated ball valve as set forth in claim 1 wherein said valve comprises a solenoid-actuated valve.

3. An actuated ball valve as set forth in claim 1 wherein said reciprocal member comprises a rack gear having a piston member disposed on at least one longitudinal end thereof.

4. An actuated ball valve as set forth in claim 1 further comprising a restrictor disposed within said fluid passage of said ball valve.

5. A fluid circuit for use in a refrigeration or air conditioning system, said fluid circuit comprising:

a compressor;

a high pressure side located on a discharge side of said compressor;

a low pressure side located on an input side of said compressor;

an incrementally positionable actuated ball valve, said actuated ball valve comprising a ball valve and a valve actuator;

said valve actuator comprising an inlet port in constant fluid communication with said high pressure side of said fluid circuit and at least one outlet port in fluid communication with said low pressure side of said fluid circuit;

a sensor operable to detect the incremental position of said ball valve; and a controller operable to control the incremental position of said ball valve.

6. A fluid circuit for use in a refrigeration or air conditioning system as set forth in claim 5 wherein said ball valve is comprising at least one fluid passage in fluid communication with said fluid circuit.

7. An incrementally positionable actuated ball valve for use in a fluid circuit of a refrigeration or air conditioning system containing an operating fluid under pressure and having a high-pressure side and a low-pressure side, said actuated ball valve comprising:

a ball valve comprising at least one fluid passage therethrough, said ball valve adapted to be disposed within said fluid circuit such that said fluid passage is in fluid communication with said fluid circuit;

a valve actuator comprising an inlet port adapted to be in constant fluid communication with said high-pressure side of a said fluid circuit and at least one outlet port adapted to be in fluid communication with said low-pressure side of said fluid circuit;

a sensor operable to detect the incremental position of said ball valve between a first position and a second position; and a controller operable to control the incremental position of said ball valve between said first position and said second position.

8. An actuated ball Valve as set forth in claim 7 wherein said valve actuator is further comprising:

a manifold comprising said inlet port;

at least one outlet port operator comprising said at least one outlet port and a valve for directing said pressurized fluid to said outlet port or said manifold;

a reciprocal member disposed within said manifold for reciprocal displacement therein; and a pinion member cooperating with said reciprocal member such that a displacement of said reciprocal member causes a corresponding angular displacement of said pinion member, said pinion member also cooperating with a stem operator of said ball valve.

9. An actuated ball valve as set forth in claim 8 wherein said valve of said at least one outlet port operator comprises a solenoid-actuated valve.

10. An actuated ball valve as set forth in claim 8 wherein said reciprocal member comprises a rack gear having a piston member disposed on at least one longitudinal end thereof.

11. An actuated ball valve as set forth in claim 8 wherein said valve of said at least one outlet port operator comprises a pilot valve.

12. An actuated ball valve as set forth in claim 7 further comprising a restrictor disposed within said fluid passage of said ball valve.

13. An actuated ball valve as set forth in claim 7 wherein said at least one outlet port is comprising a first outlet port and a second outlet port, and wherein said valve actuator is further comprising;

a manifold comprising said inlet port;

a first outlet port operator comprising said first outlet port and a solenoid valve for directing said pressurized fluid to said first outlet port or said manifold;

a second outlet port operator comprising said second outlet port and a pilot valve for directing said pressurized fluid to said second outlet port or said manifold.

14. An actuated ball valve as set forth in claim 7 wherein said at least one outlet port is comprising a first outlet port and a second outlet port; and wherein said valve actuator is further comprising:

a manifold comprising said inlet port;

a first outlet port operator comprising said first outlet port and a first solenoid valve for directing said pressurized fluid to said first outlet port or said manifold;

a second outlet port operator comprising said second outlet port and a second solenoid valve for directing said pressurized fluid to said second outlet port or said manifold.

* * * * *